(12) United States Patent
Mohanty et al.

(10) Patent No.: US 11,983,464 B2
(45) Date of Patent: May 14, 2024

(54) NEURAL NETWORK-BASED MESSAGE COMMUNICATION FRAMEWORK WITH SUMMARIZATION AND ON-DEMAND AUDIO OUTPUT GENERATION

(71) Applicant: Dell Products L.P., Round Rock, TX (US)

(72) Inventors: Bijan Kumar Mohanty, Austin, TX (US); Dhilip S. Kumar, Bangalore (IN); Hung T. Dinh, Austin, TX (US); Sarath Kumar Kalavala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/505,971

(22) Filed: Oct. 20, 2021

(65) Prior Publication Data

US 2023/0117224 A1 Apr. 20, 2023

(51) Int. Cl.
*G06F 40/58* (2020.01)
*G06F 3/16* (2006.01)
(Continued)

(52) U.S. Cl.
CPC .............. *G06F 3/167* (2013.01); *G06F 9/546* (2013.01); *G06F 40/30* (2020.01); *G06F 40/58* (2020.01); *G06N 3/044* (2023.01); *G06N 3/08* (2013.01)

(58) Field of Classification Search
CPC .......... G06F 3/167; G06F 40/56; G06F 40/58; G06F 9/546; G06F 40/30; G06N 3/08; G06N 3/0445
See application file for complete search history.

(56) References Cited

U.S. PATENT DOCUMENTS 8,108,398 B2 * 1/2012 Guday ................. G06F 16/345
707/738
10,936,796 B2 * 3/2021 Kadambi ................ G06F 40/30
(Continued)

OTHER PUBLICATIONS

Wikipedia, BERT (language model), https://en.wikipedia.org/wiki/BERT_(language_model), accessed Oct. 14, 2021.
(Continued)

*Primary Examiner* — Scott T Baderman
*Assistant Examiner* — Mario M Velez-Lopez
(74) *Attorney, Agent, or Firm* — Ryan, Mason & Lewis, LLP

(57) ABSTRACT

Methods, apparatus, and processor-readable storage media for a neural network-based message communication framework with summarization and on-demand audio output generation are provided herein. An example computer-implemented method includes obtaining message communication content; determining intent-related information and domain-related information in the obtained message communication content by processing at least a portion of the obtained message communication content using one or more machine learning-based natural language processing techniques; generating a summarization of the obtained message communication content by processing, using at least one neural network, at least a portion of the obtained message communication content in connection with at least a portion of the determined intent-related information and at least a portion of the domain-related information; converting the generated summarization from a text format to an audio format; and performing at least one automated action based at least in part on the generated summarization in the audio format.

20 Claims, 10 Drawing Sheets

```
                                                    ┌─ 900
┌─────────────────────────────────────────────────────────────┐
│ latent_dim = 500                                            │
│                                                             │
│ # Add 3 LSTM stacked layer one after another                │
│ #LSTM 1                                                     │
│ encoder_lstm1 = LSTM(latent_dim,return_sequences=True,return_state=True) │
│ encoder_output1, state_h1, state_c1 = encoder_lstm1(enc_emb)│
│                                                             │
│ #LSTM 2                                                     │
│ encoder_lstm2 = LSTM(latent_dim,return_sequences=True,return_state=True) │
│ encoder_output2, state_h2, state_c2 = encoder_lstm2(encoder_output1)    │
│                                                             │
│ #LSTM 3                                                     │
│ encoder_lstm3 = LSTM(latent_dim,return_sequences=True,return_state=True) │
│ encoder_output3, state_h3, state_c3 = encoder_lstm3(encoder_output2)    │
└─────────────────────────────────────────────────────────────┘
```

(51) Int. Cl.
*G06F 9/54* (2006.01)
*G06F 40/30* (2020.01)
*G06N 3/044* (2023.01)
*G06N 3/08* (2023.01)

(56) References Cited

U.S. PATENT DOCUMENTS

| | | | | |
|---|---|---|---|---|
| 11,334,611 | B2* | 5/2022 | Kikin-Gil | G06F 16/383 |
| 11,675,790 | B1* | 6/2023 | Jami | G06F 18/217 |
| | | | | 707/736 |
| 2002/0078090 | A1* | 6/2002 | Hwang | G06F 16/353 |
| | | | | 715/201 |
| 2012/0290289 | A1* | 11/2012 | Manera | G06F 40/30 |
| | | | | 704/9 |
| 2015/0279390 | A1* | 10/2015 | Mani | G10L 25/48 |
| | | | | 704/235 |
| 2016/0313868 | A1* | 10/2016 | Weng | G06F 3/04883 |
| 2018/0300400 | A1* | 10/2018 | Paulus | G06N 3/044 |
| 2018/0331842 | A1* | 11/2018 | Faulkner | H04N 7/15 |
| 2019/0206385 | A1* | 7/2019 | Avital | H04L 51/063 |
| 2020/0403817 | A1* | 12/2020 | Daredia | G06F 16/438 |
| 2021/0043211 | A1* | 2/2021 | Leidner | G06F 16/35 |
| 2021/0295822 | A1* | 9/2021 | Tomkins | G06F 40/40 |
| 2022/0129636 | A1* | 4/2022 | Baughman | G06F 16/248 |
| 2023/0069113 | A1* | 3/2023 | Tsuchida | G06F 16/345 |

OTHER PUBLICATIONS

Liu et al., Google AI Blog, PEGASUS: A State-of-the-Art Model for Abstractive Text Summarization, https://ai.googleblog.com/2020/06/pegasus-state-of-art-model-for.html, Jun. 2020.

Dive Deep Into Learning, Bahdanau Attention, https://d2l.ai/chapter_attention-mechanisms/bahdanau-attention.html, accessed Oct. 14, 2021.

Colah's Blog, Neural Networks, Types, and Functional Programming, http://colah.github.io/posts/2015-09-NN-Types-FP/, Sep. 3, 2015.

* cited by examiner

```
# Remove special characters (non-ascii)
def remove_non_ascii(words):
    """Remove non_ASCII characters from list of tokenized words"""
    new_words = []
    for word in words:
        new_word = unicodedata.normalize('NFKD', word).encode('ascii', 'ignore').decode('utf-8', 'ignore')
        new_words.append(new_word)
    return new_words

# Remove Punctuation characters
def remove_punctuation(words):
    """Remove punctuation from list of tokenized words"""
    new_words = []
    for word in words:
        new_word = re.sub(r'[^\w\s]', '', word)
        if new_word != '':
            new_words.append(new_word)
    return new_words

# Conversion to Lowercase
def to_lowercase(words):
    """Convert all characters to Lowercase from list of tokenized words"""
    new_words = []
    for word in words:
        new_word = word.lower()
        new_words.append(new_word)
    return new_words
```

TO FIGURE 5 cont.

FROM FIGURE 5

```
# Remove Stopwords
stop_words = set(stopwords.words('english'))
print('Total number of stopwords before removing custom words :', len(stop_words))

customlist = ['not', "couldn't", 'didn', "didn't", 'doesn', "doesn't", 'hadn', "hadn't", 'hasn',
"hasn't", 'haven', "haven't", 'isn', "isn't", 'ma', 'mightn', "mightn't", 'mustn',
"mustn't", 'needn', "needn't", 'shan', "shan't", 'shouldn', "shouldn't", 'wasn',
"wasn't", 'weren', "weren't", 'won', "won't", 'wouldn', "wouldn't"]

# Set custom stop-word's list as not, couldn't etc. words matter in sentiment,
# so not removing them from original data.

new_stopwords_list = set(stop_words)
stop_words = set([word for word in new_stopwords_list if word not in customlist])

print('Total number of stopwords after removing custom words :', len(stop_words))

def remove_stopwords(words):
    """"Remove stops words from list of tokenized words""""
    new_words = []
    for word in words:
        if word not in stop_words:
            new_words.append(new_word)
    return new_words
```

```
from keras.preprocessing.text import Tokenizer
tokenizer = Tokenizer()
tokenizer.fit_on_texts(list(text_df['cleaned_text']))

# Convert Text sequence to Integer sequence
tokenized = tokenizer.texts_to_sequences(text_df['cleaned_text'])
```

```
from keras.preprocessing.sequence import pad_sequences
max_len_text=200
tokenized = pad_sequences(tokenized, maxlen=max_len_text, padding='post')
```

```
from tensorflow.keras.layers import Input, LSTM, Embedding, Dense, Concatenate, TimeDistributed, Bidirectional
from tensorflow.keras.models import Model encoder_inputs = Input(shape=(max_len_text,))
enc_emb = Embedding(x_voc_size, latent_dim,trainable=True)(encoder_inputs)
```

FIG. 9

```
latent_dim = 500

# Add 3 LSTM stacked layer one after another
#LSTM 1
encoder_lstm1 = LSTM(latent_dim,return_sequences=True,return_state=True)
encoder_output1, state_h1, state_c1 = encoder_lstm1(enc_emb)

#LSTM 2
encoder_lstm2 = LSTM(latent_dim,return_sequences=True,return_state=True)
encoder_output2, state_h2, state_c2 = encoder_lstm2(encoder_output1)

#LSTM 3
encoder_lstm3 = LSTM(latent_dim,return_sequences=True,return_state=True)
encoder_output3, state_h3, state_c3 = encoder_lstm3(encoder_output2)
```

FIG. 10

```
from pyttsx3 play audio instantly by converting text to speech
engine = pyttsx3.init('sapi5')
engine.say(text)
engine.runAndWait()

# Save audio to file
engine.save_to_file(text, 'audio.mp3')
engine.runAndWait()
```

US 11,983,464 B2

1

NEURAL NETWORK-BASED MESSAGE COMMUNICATION FRAMEWORK WITH SUMMARIZATION AND ON-DEMAND AUDIO OUTPUT GENERATION

FIELD

The field relates generally to information processing systems, and more particularly to techniques for processing communication data using such systems.

BACKGROUND

As more individuals are working remotely, they are increasingly receiving and consuming the contents of message communications and notifications while on the move and/or via mobile devices. Such types of consumption increases the demand for concise messages and/or content, which users may also prefer to be read aloud. Accordingly, conventional message processing approaches commonly include cropping text from various parts of a message in an attempt to reduce the word volume of the content. However, such approaches can result in erroneous and/or inappropriate meanings being attributed to portions of original messages.

SUMMARY

Illustrative embodiments of the disclosure provide a neural network-based message communication framework with summarization and on-demand audio output generation. An exemplary computer-implemented method includes obtaining message communication content, and determining intent-related information and domain-related information in the obtained message communication content by processing at least a portion of the obtained message communication content using one or more machine learning-based natural language processing techniques. The method also includes generating a summarization of the obtained message communication content by processing, using at least one neural network, at least a portion of the obtained message communication content in connection with at least a portion of the determined intent-related information and at least a portion of the domain-related information. Further, the method additionally includes converting the generated summarization from a text format to an audio format, and performing at least one automated action based at least in part on the generated summarization in the audio format.

Illustrative embodiments can provide significant advantages relative to conventional message processing approaches. For example, problems associated with erroneous and/or inappropriate meanings being attributed to portions of original messages are overcome in one or more embodiments through implementation of a neural network-based message communication framework.

These and other illustrative embodiments described herein include, without limitation, methods, apparatus, systems, and computer program products comprising processor-readable storage media.

BRIEF DESCRIPTION OF THE DRAWINGS

FIG. 5 shows an example code snippet for text preprocessing of a message in an illustrative embodiment.

FIG. 6 shows an example code snippet for tokenization of message text in an illustrative embodiment.

FIG. 7 shows an example code snippet for padding message text in an illustrative embodiment.

FIG. 8 shows an example code snippet for building a neural network model in an illustrative embodiment.

FIG. 9 shows an example code snippet for adding LSTM layers to a neural network model in an illustrative embodiment.

FIG. 10 shows an example code snippet for implementing text-to-speech conversion in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
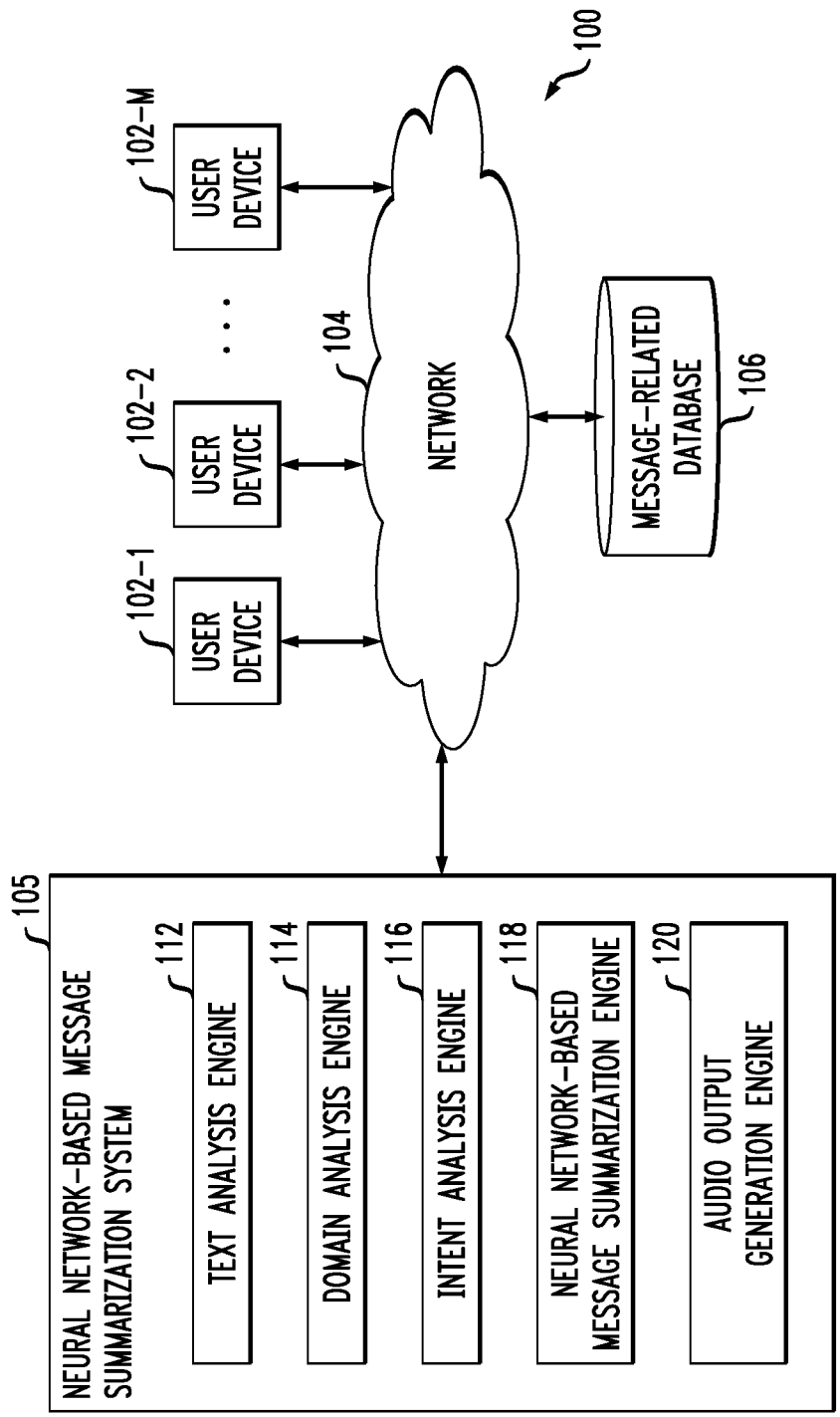
FIG. 1 shows an information processing system configured for implementation of a neural network-based message communication framework with summarization and on-demand audio output generation in an illustrative embodiment.

FIG. 1 shows a computer network (also referred to herein as an information processing system) 100 configured in accordance with an illustrative embodiment. The computer network 100 comprises a plurality of user devices 102-1, 102-2, ... 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is neural network-based message summarization system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, neural network-based message summarization system 105 can have an associated message-related database 106 configured to store data pertaining to message communication and processing thereof, which comprise, for example, intent-related data, domain-related data, summarization-related data, voice-related data, etc.

The message-related database 106 in the present embodiment is implemented using one or more storage systems associated with neural network-based message summarization system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with neural network-based message summarization system 105 are one or more input-output devices, which illustratively comprise keyboards, displays or other types of input-output devices in any combination. Such input-output devices can be used, for example, to support one or more user interfaces to neural network-based message summarization system 105, as well as to support communication between neural network-based message summarization system 105 and other related systems and devices not explicitly shown.

Additionally, neural network-based message summarization system 105 in the FIG. 1 embodiment is assumed to be implemented using at least one processing device. Each such processing device generally comprises at least one processor and an associated memory, and implements one or more functional modules for controlling certain features of neural network-based message summarization system 105.

More particularly, neural network-based message summarization system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows neural network-based message summarization system 105 to communicate over the network 104 with the user devices 102, and illustratively comprises one or more conventional transceivers.

The neural network-based message summarization system 105 further comprises text analysis engine 112, domain analysis engine 114, intent analysis engine 116, neural network-based message summarization engine 118, and audio output generation engine 120.

It is to be appreciated that this particular arrangement of elements 112, 114, 116, 118 and 120 illustrated in neural network-based message summarization system 105 of the FIG. 1 embodiment is presented by way of example only, and alternative arrangements can be used in other embodiments. For example, the functionality associated with elements 112, 114, 116, 118 and 120 in other embodiments can be combined into a single module, or separated across a larger number of modules. As another example, multiple distinct processors can be used to implement different ones of elements 112, 114, 116, 118 and 120 or portions thereof.

At least portions of elements 112, 114, 116, 118 and 120 may be implemented at least in part in the form of software that is stored in memory and executed by a processor.

It is to be understood that the particular set of elements shown in FIG. 1 for implementing a neural network-based message communication framework involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, neural network-based message summarization system 105 and message-related database 106 can be on and/or part of the same processing platform.

An exemplary process utilizing elements 112, 114, 116, 118 and 120 of an example neural network-based message summarization system 105 in computer network 100 will be described in more detail with reference to the flow diagram of FIG. 11.

Accordingly, at least one embodiment includes generating and/or implementing an intelligent communication framework to convey messages in a concise manner, maintaining the original context and intent of such messages. As detailed herein, such an embodiment includes leveraging machine learning models (e.g., natural language processing (NLP) models) trained using general language corpus data as well as domain-specific corpus data. One or more embodiments include performing domain analysis to learn the context of one or more conversations using domain-specific sentence scores, latent semantic analysis (LSA) to identify semantically introductory sentences, and multi-lingual and multimode summarization (e.g., text-to-text, text-to-speech, speech-to-text, and speech-to-speech) of messages.

Figure 2:
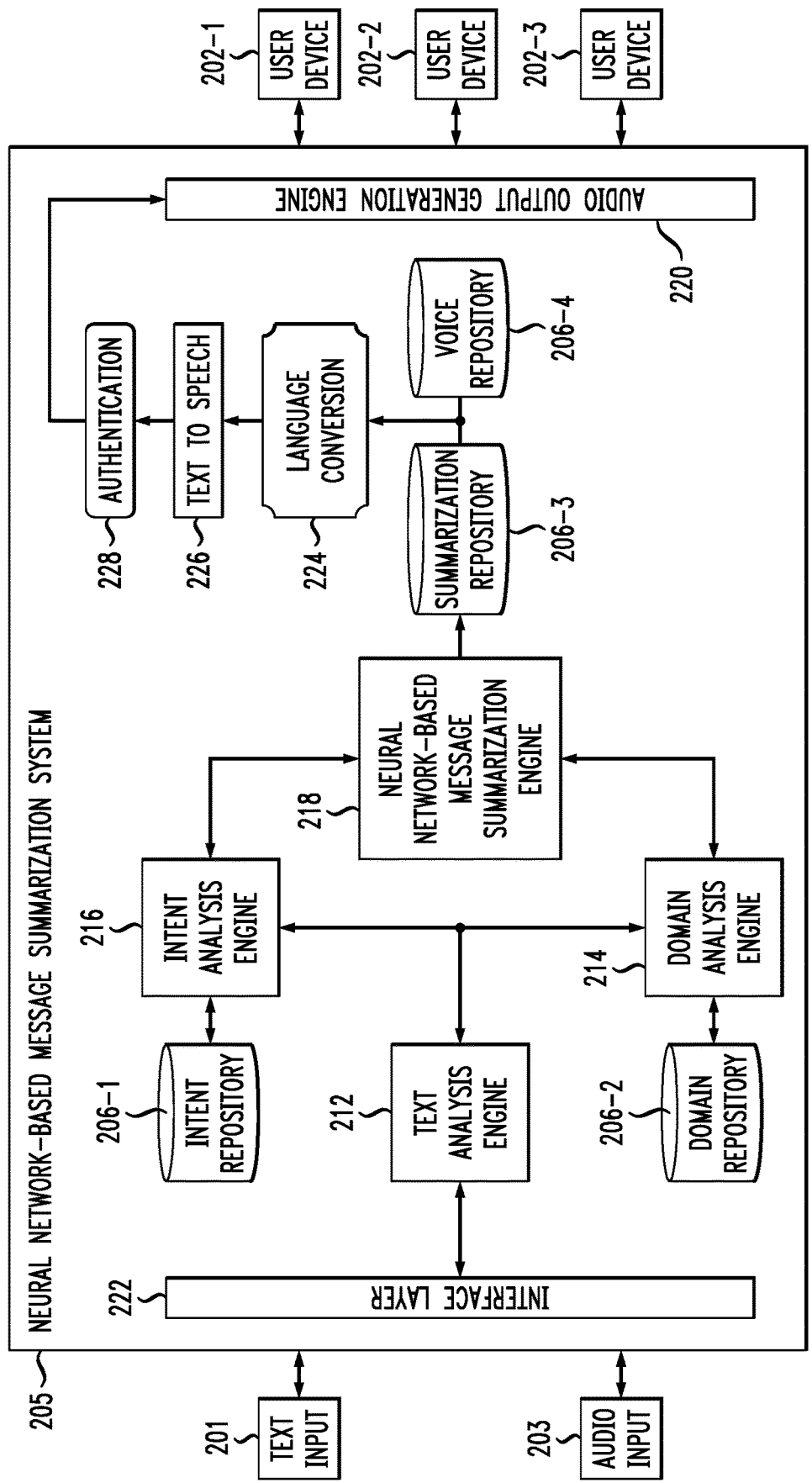
FIG. 2 shows example architecture of a neural network-based message communication framework in an illustrative embodiment.

FIG. 2 shows example architecture of a neural network-based message summarization system in an illustrative embodiment. By way of illustration, FIG. 2 depicts neural network-based message summarization system 205, which analyzes incoming natural language inputs (e.g., text input 201 and/or audio input 203) and generates appropriate summaries to be distributed to users over one or more user devices (e.g., user device 202-1, user device 202-2, and/or user device 202-3). Within neural network-based message summarization system 205, an interface layer 222 receives communications in textual formats (via text input 201) and audio formats (via audio input 203). Speech-to-text mechanisms (e.g., within the interface layer 222) convert at least a portion of the received audio communications into textual data. The textual data are then input to and analyzed by a text analysis engine 212.

As depicted in FIG. 2, one or more embodiments include extending message summarization capabilities to include intent-related information, sensitivity-related information, and domain-related information, learned from the message and/or user behavior over a given period of time. Accordingly, in such an embodiment, domain-based intelligent text and/or speech summarization can be configured and learned for at least one given domain. This can be achieved by initially configuring neural network-based message summarization system 205 with general-purpose and domain-specific content for a given domain and/or subject area. Over time, neural network-based message summarization system 205 can accumulate domain expertise associated with multiple items of content of the given domain.

Part of this functionality includes understanding and expressing such information in natural language. For example, neural network-based message summarization system 205 can operate in a stealth mode while scanning content and/or documents and building its domain expertise repository (e.g., repository 206-2 in FIG. 2). Such functionality enables the neural network-based message summarization system 205 to reflect the main idea of given content, to make intelligent summarization decisions, and to apply grammar and/or relevant words as necessary.

Additionally, at least one embodiment includes a communication management component (e.g., as part of interface layer 222 in FIG. 2), which receives information in text format (e.g., text input 201) and/or audio format (e.g., audio input 203). As part of the communication management component, an audio analyzer performs audio classification, speech recognition, and speech synthesis, while a text analyzer performs entity recognition, intent determination, sentiment determination, and content classification. As illustrated in FIG. 2, text data, both derived from text input 201 and converted speech-to-text data derived from audio input 203, is processed by text analysis engine 212.

In one or more embodiments, text analysis engine processes at least a portion of the text data using one or more machine learning-based NLP techniques, which can interpret the text into specific vocabulary, misspellings, word synonyms, complicated abbreviations, etc. Such NLP techniques identify one or more restrictions that are specified, and also facilitates grammar cloning, rule filtering, searching, grammar pruning, processing, and restriction filtering.

As also illustrated in FIG. 2, domain repository 206-2 stores domain-specific words, relationships (e.g., synonyms, antonyms, etc.), properties, and connections, as determined by domain analysis engine 214, which processes at least a portion of the output generated by text analysis engine 212.

Similarly, intent repository 206-1 stores sensitivity-related data and emotion-related data, as determined by intent analysis engine 216, which processes at least a portion of the output generated by text analysis engine 212.

By way of example, text analysis engine 212 can include conversation intelligence which processes input text using natural language processing techniques to discover one or more patterns, intent-related information, domain-related information, relevance, emotions, relationship and/or other properties. In at least one embodiment, text analysis engine 212 also includes an intelligent model transformation component, which collects the intent-related information, sensitivity information, emotions, and natural language output to transform the input text into a graphical model in connection with one or more entities and property relations of the input text.

As also illustrated, FIG. 2 depicts neural network-based message summarization engine 218, is responsible for summarizing the content (i.e., the input message(s)). In one or more embodiments, neural network-based message summarization engine 218 performs, based at least in part on outputs generated by domain analysis engine 214 and intent analysis engine 216, text summarization, which is an NLP application that can be achieved using an extractive approach and/or an abstractive approach. Extractive summarization includes one or more techniques that involve the extraction of important words and/or phrases from the input text. Extractive text summarization can be carried out, for example, by selecting and/or identifying the most important words, phrases, and/or sentences from the original text in a way that forms the final summary of the message. Abstractive summarization involves the generation of entirely new words and/or phrases that capture the meaning of the input text. Such techniques put an emphasis on grammatical summaries, thereby requiring advanced language modeling techniques for natural language generation (NLG).

At least one invention includes leveraging abstractive summarization techniques to generate a message summary by rephrasing words and/or using new words, while maintaining the meaning of the original message. By way merely of illustration, an example embodiment can include implementing a sequence-to-sequence model using deep learning techniques. Because input content in a natural language context includes a sequence of words in the text body, and the output summary is also a sequence of words, such an embodiment can be modeled as a many-to-many sequence-to-sequence problem.

A many-to-many sequence-to-sequence context can include the utilization of at least one encoder and at least one decoder, as well as a supporting capability referred to herein as an attention mechanism. Using encoder-decoder architecture facilitates solving sequence-to-sequence problems such as text summarization wherein input and output sequences are of different lengths. To better understand context and analyze messages efficiently, one or more embodiments include using (in connection with neural network-based message summarization engine 218, for example) at least one bi-directional RNN which uses two separate processing sequences, one from left-to-right and another from right-to-left. Additionally, as further detailed herein, such an embodiment can include leveraging a bi-directional RNN with LSTM for the encoder.

As is to be appreciated by one skilled in the art, RNNs include neural networks wherein the previous step's output feeds into the current step's input. In language processing, it can be important to remember the previous word(s) before predicting the next word of a sentence or passage. Accordingly, RNN provides effectiveness by having at least one hidden state recognize one or more words in the given sentence or passage. For example, if sentences are too long, some of the previous information may not be available in the limited hidden state, which requires the bi-directional processing of the sentence (from past and future in two sequences parallelly) as carried out in a bi-directional RNN. LSTM introduces advanced memory units and gates to an RNN, akin, for instance, to knobs and dials to improve the model's accuracy and performance.

Referring again to FIG. 2, summarization repository 206-3 maintains all generated summarizations with the corresponding original text and authorization details. Based at least in part on the summarization data from repository 206-3 and/or voice-related data from voice repository 206-4, language translation of the summarization can be carried out via language conversion component 224. Voice repository 206-4, in one or more embodiments, can maintain data pertaining to one or more author voices such that portions of the voice data can be applied to generated summarizations. Also, such language conversions as noted above can include converting at least a portion of a summarization from a first language to at least a second language associated with a configured locale of the content user.

Additionally, at least a portion of the language-converted text can be further converted from a text format to an audio format using text-to-speech component 226. Further, as also depicted in FIG. 2, one or more embodiments include leveraging an authentication component 228 in connection with producing a playback and/or audio output of the summarization (e.g., reading aloud the summarization using voice data from voice repository 206-4) via audio output generation engine 220. In such an embodiment, authentication component 228 is responsible for authenticating the user who is attempting to play and/or view the summarization audio and/or text. Such authentication can include a user identifier and password combination-based model, a single sign-on (SSO) token, etc. Additionally, in at least one embodiment, audio output generation engine 220 can include a summarization access gateway, which provides access, to one or more user devices (e.g., user device 202-1, 202-2 and/or 202-3), to the summarization with authorized criteria (determined in connection with authentication component 228).

Figure 3:
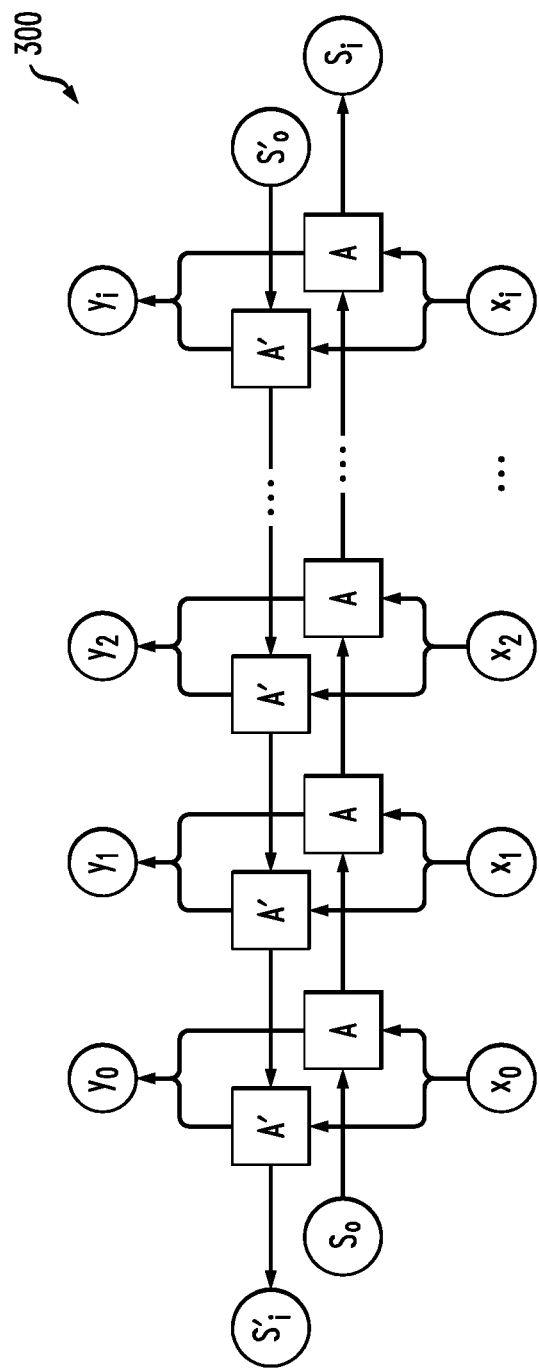
FIG. 3 shows example architecture of a bi-directional recurrent neural network (RNN) in an illustrative embodiment.

FIG. 3 shows example architecture of a bi-directional RNN 300 in an illustrative embodiment. By way of illustration, FIG. 3 depicts two separate RNN/LSTM networks combined to form bi-directional LSTM network 300 wherein "x" represents the input text in the time space. For example, $x_0$ is at the $0^{th}$ sequence and $x_1$ is the text at $1^{st}$ sequence, etc. Similarly, "y" represents the output and also follows the same time space paradigm. Further, "A" indicates the RNN/LSTM in the forward network (S) while "A prime" (A') indicates the neurons in the backward network (S').

Figure 4:
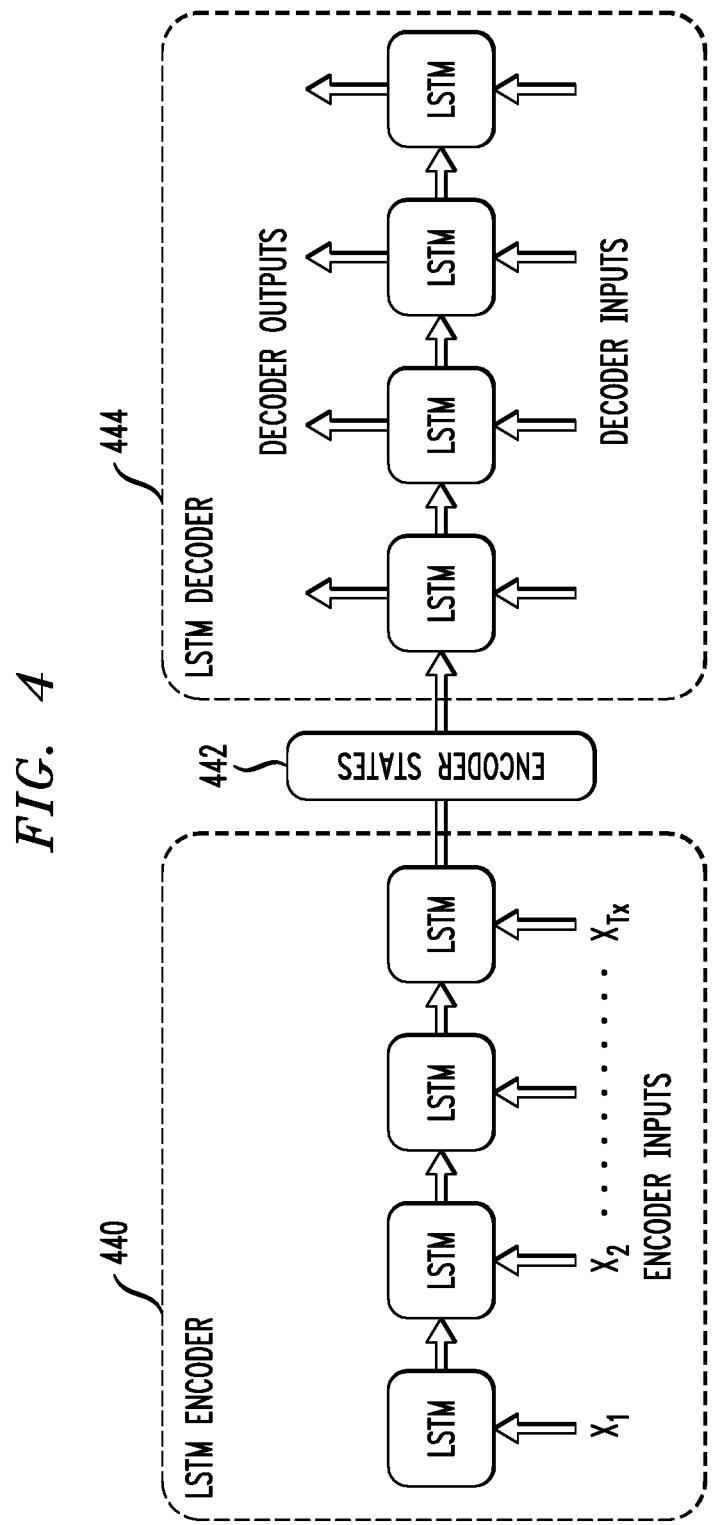
FIG. 4 shows example long short-term memory (LSTM) based encoder-decoder architecture in an illustrative embodiment.

FIG. 4 shows example LSTM based encoder-decoder architecture in an illustrative embodiment. By way of illustration, FIG. 4 depicts a bi-directional LSTM encoder 440, which reads one input (e.g., word) at a time and updates its hidden encoder state 442 based on the current word and the input (e.g., words) read before the current input (e.g., word), thus keeping the overall meaning of the text intact while building context. Additionally, FIG. 4 also depicts a uni-directional LSTM decoder 444 which generates a summary one word at a time by using the information from the bi-directional LSTM encoder 440 as well as previously generated words and/or information in the summary in question.

As noted above and further detailed herein, one or more embodiments include using an attention mechanism, for example, when the input text is long and a sufficient amount of context must be maintained to keep the meaning of the message. Typically, a decoder (e.g., such as uni-directional LSTM decoder 444) obtains the input from the final hidden state (e.g., hidden state 442) of the encoder (e.g., bi-directional LSTM encoder 440), which may not have enough dimensions for longer input text. In one or more embodiments, using an attention mechanism, the decoder can access one or more intermediate hidden states of the encoder to assist in deciding which word to be written next (in a summary). When all hidden states can be accessed, the attention mechanism is referred to as a global attention mechanism, and when only a portion of the hidden states are accessed, the attention mechanism is referred to as a local attention mechanism. Attention mechanisms weigh individual words in the input sequence according to the impact each such word makes on the target sequence generation. In at least one embodiment, a custom attention mechanism can be built by extending and/or implementing an attention layer such as, for example, a Bahadanau attention layer. Further, once the custom attention mechanism is loaded, the attention layer can be imported similar to other libraries.

FIG. 5 shows an example code snippet for text preprocessing of a message in an illustrative embodiment. In this embodiment, example code snippet 500 is executed by or under the control of at least one processing system and/or device. For example, the example code snippet 500 may be viewed as comprising a portion of a software implementation of at least part of neural network-based message summarization system 105 of the FIG. 1 embodiment.

The example code snippet 500 illustrates text preprocessing of a given message, which includes removal of stop words and unwanted characters such as white spaces, special characters, etc., as well as converting all characters in the text to lowercase.

It is to be appreciated that this particular example code snippet shows just one example implementation of text preprocessing of a message, and alternative implementations of the process can be used in other embodiments.

Once the text preprocessing is completed, one or more embodiments include implementing a start token marker and a stop token marker in the text. This can be achieved, for example, by using a python function such as follows: Text_df['cleaned_text']=data['cleaned_text'].apply(lambda x:'_START_'+x+'_END_').

FIG. 6 shows an example code snippet for tokenization of message text in an illustrative embodiment. In this embodiment, example code snippet 600 is executed by or under the control of at least one processing system and/or device. For example, the example code snippet 600 may be viewed as comprising a portion of a software implementation of at least part of neural network-based message summarization system 105 of the FIG. 1 embodiment.

The example code snippet 600 illustrates a process for tokenization, which includes breaking up the text into meaningful chunks and/or tokens. Because artificial intelligence techniques such as implemented in one or more embodiments understand integers and vectors, tokenization breaks the text into a token sequence and then converts the token sequence into an integer sequence.

It is to be appreciated that this particular example code snippet shows just one example implementation of tokenization of message text, and alternative implementations of the process can be used in other embodiments.

FIG. 7 shows an example code snippet for padding message text in an illustrative embodiment. In this embodiment, example code snippet 700 is executed by or under the control of at least one processing system and/or device. For example, the example code snippet 700 may be viewed as comprising a portion of a software implementation of at least part of neural network-based message summarization system 105 of the FIG. 1 embodiment.

The example code snippet 700 illustrates a process for controlling the size of the communication message content to a fixed size. Specifically, example code snippet 700 includes padding the text to the maximum length allowed.

It is to be appreciated that this particular example code snippet shows just one example implementation of padding message text, and alternative implementations of the process can be used in other embodiments.

FIG. 8 shows an example code snippet for building a neural network model in an illustrative embodiment. In this embodiment, example code snippet 800 is executed by or under the control of at least one processing system and/or device. For example, the example code snippet 800 may be viewed as comprising a portion of a software implementation of at least part of neural network-based message summarization system 105 of the FIG. 1 embodiment.

The example code snippet 800 illustrates building a model using stacked LSTM for sequence-to-sequence transformation. The model uses Numpy arrays encoder_input, decoder_input and decoder_target, which form the basis of the model. For example, encoder_input is created by calling a Keras input function and passing the maximum length of the text as the value to the shape parameter.

It is to be appreciated that this particular example code snippet shows just one example implementation of building a neural network model, and alternative implementations of the process can be used in other embodiments.

FIG. 9 shows an example code snippet for adding LSTM layers to a neural network model in an illustrative embodiment. In this embodiment, example code snippet 900 is executed by or under the control of at least one processing system and/or device. For example, the example code snippet 900 may be viewed as comprising a portion of a software implementation of at least part of neural network-based message summarization system 105 of the FIG. 1 embodiment.

The example code snippet 900 illustrates adding, as part of a stacked LSTM, multiple (e.g., three to five) LSTM layers in the model by calling a Keras LSTM function and passing the latent dimension (i.e., the number of hidden nodes being used; for example, 500) and return sequence and return states as true. When return_state is true, the LSTM produces the hidden state and cell state of the last time step only. When return_sequence is true, the LSTM produces the hidden state and cell state of all of the relevant timesteps.

It is to be appreciated that this particular example code snippet shows just one example implementation of adding LSTM layers to a neural network model, and alternative implementations of the process can be used in other embodiments.

Also, in one or more embodiments, a decoder setup is created, similar to the encoder, by calling a Keras input function such as shown in the following code: decoder_inputs=Input(shape=(None,)). At least one attention layer is added to the model by calling an AttentionLayer function, as defined in the custom attention mechanism added, and passing encoder and decoder output such as follows: Attention layer attn_layer=AttentionLayer (name='attention_layer').

Further, in at least one embodiment, the model is created by calling a Keras model function and passing the encoder input, decoder input and decoder output. By way of example, in such an embodiment, root mean squared propagation (RMSProp) or an adaptive moment optimization (Adam) algorithm can be used as the optimization algorithm. Similarly, in such an embodiment, sparce_categorical_crossentropy can be used for the loss function as follows: model.compile(optimizer='rmsprop', loss='sparse_categorical_crossentropy').

Additionally, in one or more embodiments, the neural network model is trained using a model.fit( )function, passing the training data and using a value for number of epochs. Early stopping can be used if the model needs to stop the training before all epochs are executed, e.g., when the validation loss does not reduce after a certain number of epochs. In such a scenario, it can be assumed that the model has reached optimal training and no further epochs for training are necessary. Once the model is trained, it can be queried and/or used for one or more predictions by passing sample text content as input to the predict( )function of the model.

As detailed herein, one or more embodiments can include automated translation of a generated summarization (e.g., via language conversion component 224 in FIG. 2) such that, for example, the summarized message is translated from a first language to the local language of at least one user (which can be configured by a user and/or determined via context analysis). By way of example, in such an embodiment, both summarization and language translation can be done on-demand (e.g., when the user plays the message) and/or can be done preemptively and stored in a repository for consumption at a later time.

In at least one embodiment, language translation includes the use of a sequence-to-sequence modeling approach such as machine learning algorithms that include NLP techniques and/or encoder-decoder with LSTM. Additionally or alternatively, one or more embodiments can include using transformers to implement language translation engines. Also, in one or more embodiments, translated content can be stored in a summarized content repository for future retrieval and playback by the user on an on-demand basis.

Referring again to FIG. 2, audio output generation engine 220 can operate in conjunction with text-to-speech conversion component 226 and authentication component 228 to generate speech data/output for audio playback by the user. Text-to-speech conversion component 226, in one or more embodiments, can include using NLP techniques, one or more neural networks (e.g., RNN/LSTM), one or more transformers, and/or one or more libraries. Such a library can include, for example, pyttsx3 (a text-to-speech library for python), and can be installed in the local python environment using a pip install command. The resulting voice data can be saved for later playback in an audio repository with the proper access control for authentication and authorization (in connection with authentication component 228, for example).

FIG. 10 shows an example code snippet for implementing text-to-speech conversion in an illustrative embodiment. In this embodiment, example code snippet 1000 is executed by or under the control of at least one processing system and/or device. For example, the example code snippet 1000 may be viewed as comprising a portion of a software implementation of at least part of neural network-based message summarization system 105 of the FIG. 1 embodiment.

The example code snippet 1000 illustrates using pyttsx3 by importing the library and say( ) function, and then passing the text to be converted. The resulting voice data can also be saved, for example, as one or more audio files, for later playback in an audio repository with the proper access control for authentication and authorization.

It is to be appreciated that this particular example code snippet shows just one example implementation of text-to-speech conversion, and alternative implementations of the process can be used in other embodiments.

Also, in one or more embodiments, summarized content with different audio file versions can be created depending upon the languages needed and stored in a central audio repository for management and playback. Audio files can be access-controlled based at least in part on the users and their respective authorization status. In an enterprise setting, links to the audio files can be created for and/or sent to each authorized user such that on-demand playback or read-aloud can be achieved.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 11:
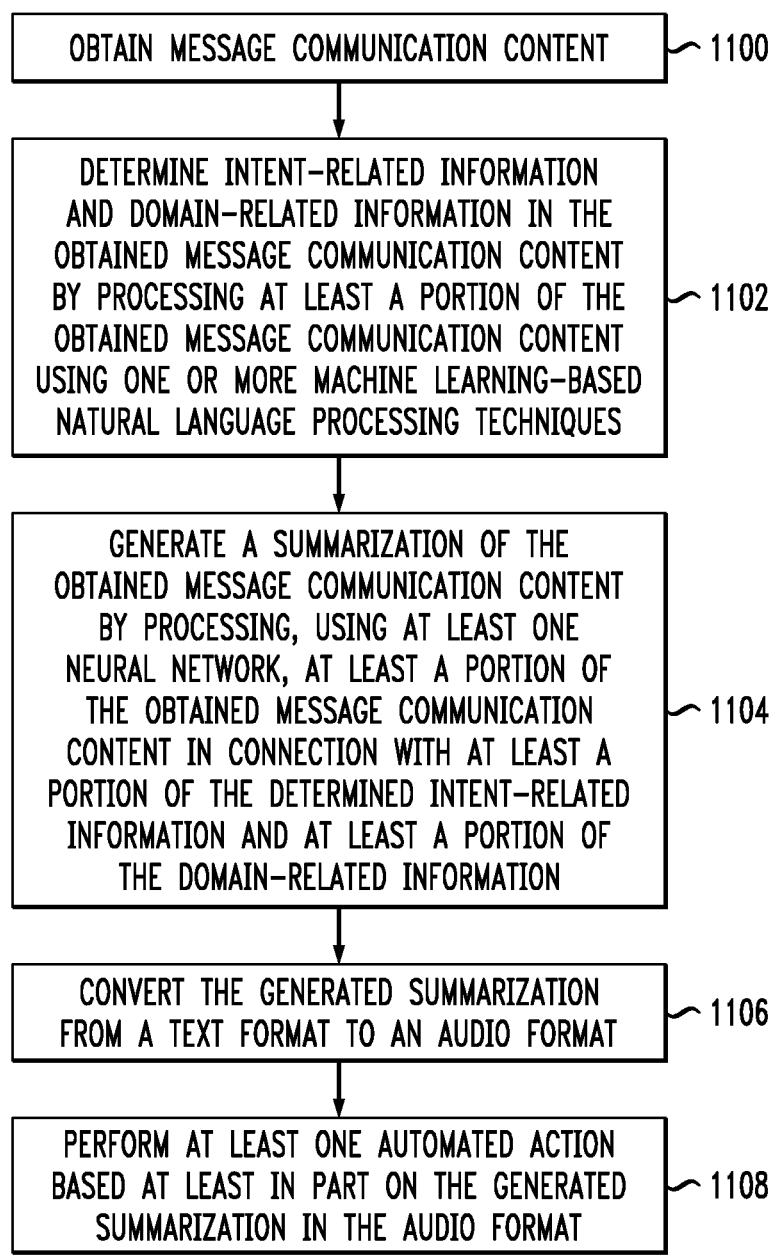
FIG. 11 is a flow diagram of a process for implementing a neural network-based message communication framework with summarization and on-demand audio output generation in an illustrative embodiment.

FIG. 11 is a flow diagram of a process for implementing a neural network-based message communication framework with summarization and on-demand audio output generation in an illustrative embodiment. It is to be understood that this particular process is only an example, and additional or alternative processes can be carried out in other embodiments.

In this embodiment, the process includes steps 1100 through 1108. These steps are assumed to be performed by neural network-based message summarization system 105 utilizing elements 112, 114, 116, 118 and 120.

Step 1100 includes obtaining message communication content. In one or more embodiments, obtaining message communication content includes obtaining message communication content in at least one of text format and audio format. Further, at least one embodiment can include converting obtained message communication content in an audio format to message communication content in a text format.

Step 1102 includes determining intent-related information and domain-related information in the obtained message communication content by processing at least a portion of the obtained message communication content using one or more machine learning-based natural language processing techniques.

Step 1104 includes generating a summarization of the obtained message communication content by processing, using at least one neural network, at least a portion of the obtained message communication content in connection with at least a portion of the determined intent-related information and at least a portion of the domain-related information. In at least one embodiment, using the at least one neural network includes processing at least a portion of the obtained message communication content in connection with at least a portion of the determined intent-related information and at least a portion of the domain-related information using at least one bi-directional recurrent neural network comprising two or more processing sequences. In such an embodiment, the at least one bi-directional recurrent neural network includes a long short-term memory encoder and a long short-term memory decoder. Additionally or alternatively, the at least one bi-directional recurrent neural network can include at least one attention mechanism, wherein generating the summarization of the obtained message communication content can include weighing, using the at least one attention mechanism, one or more words in the obtained message communication content according to an impact each of the one or more words has on a target sequence generation.

Step 1106 includes converting the generated summarization from a text format to an audio format. Also, one or more embodiments can additionally include converting at least a portion of the summarization from a first language to at least a second language associated with at least one user. Further, at least one embodiment includes training the at least one neural network based at least in part on the generated summarization.

Step 1108 includes performing at least one automated action based at least in part on the generated summarization in the audio format. In at least one embodiment, performing the at least one automated action includes outputting the generated summarization in the audio format to at least one user in response to a request from the at least one user. Additionally or alternatively, performing the at least one automated action can include linking the generated summarization in the audio format with one or more access-related authentication elements associated with one or more users.

Accordingly, the particular processing operations and other functionality described in conjunction with the flow diagram of FIG. 11 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement a neural network-based message summarization system with on-demand audio playback capabilities. These and other embodiments can effectively overcome problems associated with erroneous and/or inappropriate meanings being attributed to portions of original messages.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
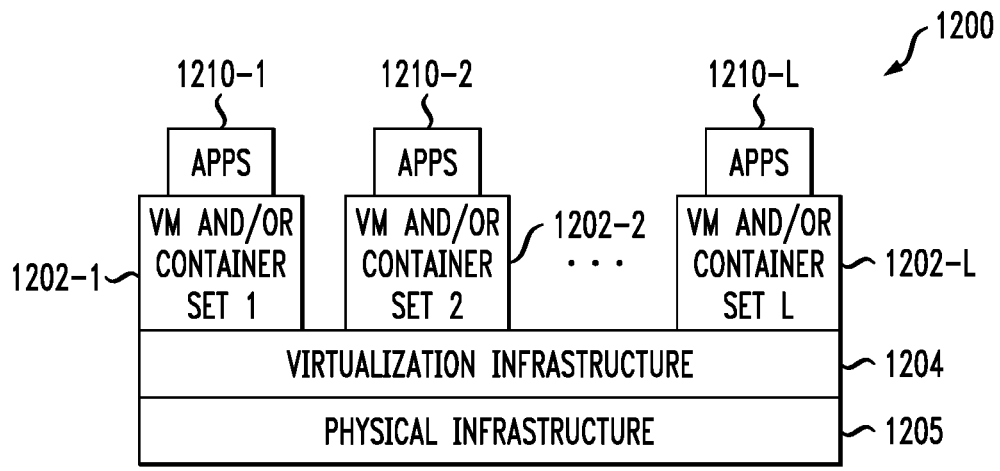
FIGS. 12 and 13 show examples of processing platforms that may be utilized to implement at least a portion of an information processing system in illustrative embodiments.
Figure 13:
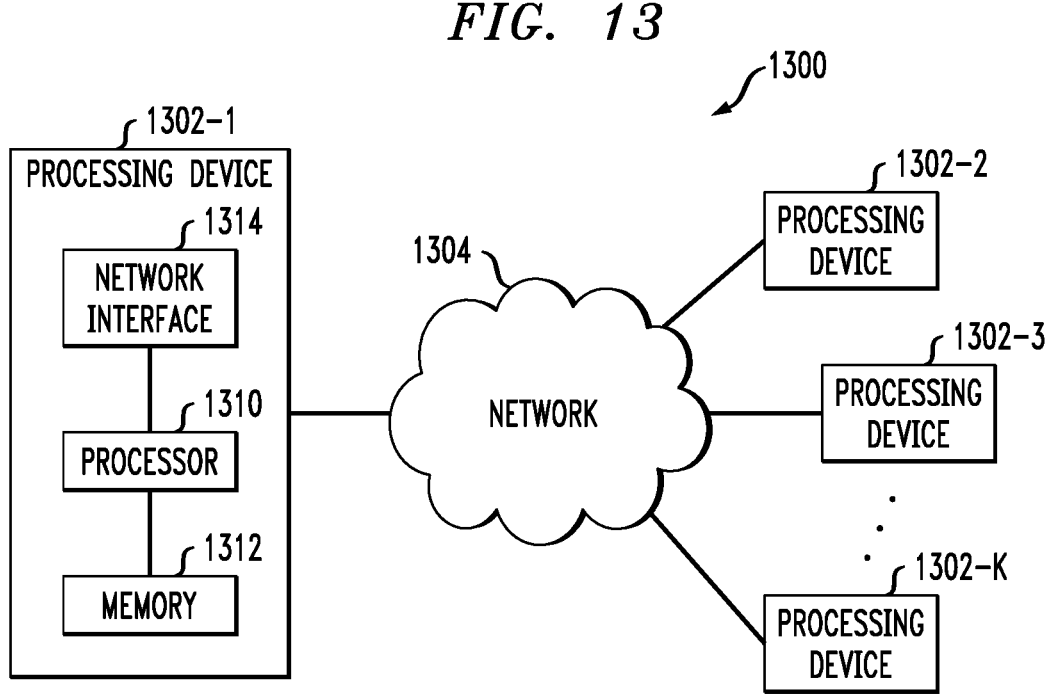

FIG. 12 shows an example processing platform comprising cloud infrastructure 1200. The cloud infrastructure 1200 comprises a combination of physical and virtual processing resources that are utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 comprise respective VMs, respective sets of one or more containers, or respective sets of one or more containers running in VMs. In some implementations of the FIG. 12 embodiment, the VMs/container sets 1202 comprise respective VMs implemented using virtualization infrastructure 1204 that comprises at least one hypervisor.

A hypervisor platform may be used to implement a hypervisor within the virtualization infrastructure 1204, wherein the hypervisor platform has an associated virtual infrastructure management system. The underlying physical machines comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 comprises a microprocessor, a microcontroller, an application-specific integrated circuit (ASIC), a field-programmable gate array (FPGA) or other type of processing circuitry, as well as portions or combinations of such circuitry elements.

The memory 1312 comprises random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining message communication content;
modifying the message communication content by adjusting one or more characteristics of the message communication content including at least a length of one or more portions of text content within the message communication content;
determining intent-related information and domain-related information in the modified message communication content by processing at least a portion of the modified message communication content using one or more machine learning-based natural language processing techniques trained on general language corpus data and domain-specific corpus data associated with multiple domains, wherein determining the domain-related information comprises identifying at least one domain, of the multiple domains, associated with the modified message communication content;
generating a summarization of the modified message communication content by processing, using at least one neural network, the at least a portion of the modified message communication content in connection with at least a portion of the determined intent-related information and at least a portion of the domain-related information, wherein using the at least one neural network comprises leveraging one or more natural language generation-based abstractive summarization techniques;
converting the generated summarization from a text format to an audio format; and
performing at least one automated action based at least in part on the generated summarization in the audio format, wherein performing the at least one automated action comprises producing and outputting an audio playback of at least a portion of the generated summarization in the audio format, using voice data associated with at least one given author voice, in response to (i) a request for the audio playback from a given user and (ii) authentication of the given user via at least one single sign-on token performed in conjunction with the request;
wherein the method is performed by at least one processing device comprising a processor coupled to a memory.

2. The computer-implemented method of claim 1, wherein using the at least one neural network comprises processing the at least a portion of the modified message communication content in connection with at least a portion of the determined intent-related information and at least a portion of the domain-related information using at least one bi-directional recurrent neural network comprising two or more processing sequences.

3. The computer-implemented method of claim 2, wherein the at least one bi-directional recurrent neural network comprises a long short-term memory encoder and a long short-term memory decoder.

4. The computer-implemented method of claim 2, wherein the at least one bi-directional recurrent neural network comprises at least one attention mechanism, and wherein generating the summarization of the modified message communication content comprises weighing, using the at least one attention mechanism, one or more words in the modified message communication content according to an impact each of the one or more words has on a target sequence generation.

5. The computer-implemented method of claim 1, wherein performing the at least one automated action comprises outputting the generated summarization in the audio format to at least one user in response to a request from the at least one user.

6. The computer-implemented method of claim 1, further comprising:
converting at least a portion of the summarization from a first language to at least a second language associated with at least one user.

7. The computer-implemented method of claim 1, further comprising:
training the at least one neural network based at least in part on the generated summarization.

8. The computer-implemented method of claim 1, wherein obtaining message communication content comprises obtaining message communication content in at least one of text format and audio format.

9. The computer-implemented method of claim 8, further comprising:
converting at least a portion of the obtained message communication content in an audio format to message communication content in a text format.

10. A non-transitory processor-readable storage medium having stored therein program code of one or more software programs, wherein the program code when executed by at least one processing device causes the at least one processing device:
to obtain message communication content;
to modify the message communication content by adjusting one or more characteristics of the message communication content including at least a length of one or more portions of text content within the message communication content;
to determine intent-related information and domain-related information in the modified message communication content by processing at least a portion of the modified message communication content using one or more machine learning-based natural language processing techniques trained on general language corpus data and domain-specific corpus data associated with multiple domains, wherein determining the domain-related information comprises identifying at least one domain, of the multiple domains, associated with the modified message communication content;
to generate a summarization of the modified message communication content by processing, using at least one neural network, the at least a portion of the modified message communication content in connection with at least a portion of the determined intent-related information and at least a portion of the domain-related information, wherein using the at least one neural network comprises leveraging one or more natural language generation-based abstractive summarization techniques;
to convert the generated summarization from a text format to an audio format; and
to perform at least one automated action based at least in part on the generated summarization in the audio format, wherein performing the at least one automated action comprises producing and outputting an audio playback of at least a portion of the generated summarization in the audio format, using voice data associated with at least one given author voice, in response to (i) a request for the audio playback from a given user and (ii) authentication of the given user via at least one single sign-on token performed in conjunction with the request.

11. The non-transitory processor-readable storage medium of claim 10, wherein using the at least one neural network comprises processing the at least a portion of the modified message communication content in connection with at least a portion of the determined intent-related information and at least a portion of the domain-related information using at least one bi-directional recurrent neural network comprising two or more processing sequences.

12. The non-transitory processor-readable storage medium of claim 11, wherein the at least one bi-directional recurrent neural network comprises a long short-term memory encoder and a long short-term memory decoder.

13. The non-transitory processor-readable storage medium of claim 11, wherein the at least one bi-directional recurrent neural network comprises at least one attention mechanism, and wherein generating the summarization of the modified message communication content comprises weighing, using the at least one attention mechanism, one or more words in the modified message communication content according to an impact each of the one or more words has on a target sequence generation.

14. The non-transitory processor-readable storage medium of claim 10, wherein performing the at least one automated action comprises outputting the generated summarization in the audio format to at least one user in response to a request from the at least one user.

15. An apparatus comprising:
at least one processing device comprising a processor coupled to a memory;
the at least one processing device being configured:
to obtain message communication content;
to modify the message communication content by adjusting one or more characteristics of the message communication content including at least a length of one or more portions of text content within the message communication content;
to determine intent-related information and domain-related information in the modified message communication content by processing at least a portion of the modified message communication content using one or more machine learning-based natural language processing techniques trained on general language corpus data and domain-specific corpus data associated with multiple domains, wherein determining the domain-related information comprises identifying at least one domain, of the multiple domains, associated with the modified message communication content;
to generate a summarization of the modified message communication content by processing, using at least one neural network, the at least a portion of the modified message communication content in connection with at least a portion of the determined intent-related information and at least a portion of the domain-related information, wherein using the at least one neural network comprises leveraging one or more natural language generation-based abstractive summarization techniques;
to convert the generated summarization from a text format to an audio format; and to perform at least one automated action based at least in part on the generated summarization in the audio format, wherein performing the at least one automated action comprises producing and outputting an audio playback of at least a portion of the generated summarization in the audio format, using voice data associated with at least one given author voice, in response to (i) a request for the audio playback from a given user and (ii) authentication of the given user via at least one single sign-on token performed in conjunction with the request.

16. The apparatus of claim 15, wherein using the at least one neural network comprises processing the at least a portion of the modified message communication content in connection with at least a portion of the determined intent-related information and at least a portion of the domain-related information using at least one bi-directional recurrent neural network comprising two or more processing sequences.

17. The apparatus of claim 16, wherein the at least one bi-directional recurrent neural network comprises a long short-term memory encoder and a long short-term memory decoder.

18. The apparatus of claim 16, wherein the at least one bi-directional recurrent neural network comprises at least one attention mechanism, and wherein generating the summarization of the modified message communication content comprises weighing, using the at least one attention mechanism, one or more words in the modified message communication content according to an impact each of the one or more words has on a target sequence generation.

19. The apparatus of claim 15, wherein performing the at least one automated action comprises outputting the generated summarization in the audio format to at least one user in response to a request from the at least one user.

20. The apparatus of claim 15, wherein the at least one processing device is further configured:

to train the at least one neural network based at least in part on the generated summarization.

\* \* \* \* \*